Patented Nov. 5, 1935

2,019,832

UNITED STATES PATENT OFFICE 2,019,832

REACTIONS OF SODIUM WITH HYDROCARBONS

Norman D. Scott, Niagara Falls, N. Y., assignor to E. I. du Pont de Nemours & Company, Inc., Wilmington, Del., a corporation of Delaware No Drawing. Application September 29, 1933
Serial No. 691,574

14 Claims. (Cl. 260—168)

This invention relates to improvements in the method of effecting the reaction of alkali metals with aromatic hydrocarbons, and more specifically to a method of effecting addition of alkali metals to naphthalene and its homologues. This application is a continuation in part of my co-pending application, Serial No. 638,524, filed October 19, 1932.

It is well known that alkali metals will react with a wide variety of hydrocarbons under a wide variety of conditions. An extensive review of this work has been published by C. B. Wooster, (Chemical Reviews XI 1 Aug. 1932). While most of the reactions described are at present of little technical significance on account of the cost of the materials involved, there is particular interest in the attempts that have been made to react alkali metals with the cheaper aromatic hydrocarbons such as naphthalene. Schlenk (Annalen 463 90–95) carried out slow reactions using lithium in ethyl ether and obtained sufficient reaction in eight days with naphthalene, and in fourteen days with diphenyl, to permit some examination of the products formed. He represented the alkali metal compounds by the formulæ,

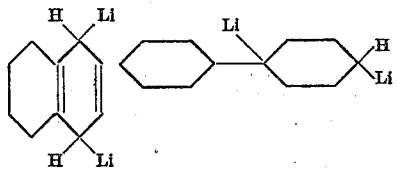

Schlenk, using ethyl ether as solvent, failed to get any detectable reaction of sodium with these hydrocarbons even in months. He attributed this to a poisoning effect on the sodium of minute traces of sulfur compounds present even in the best grades of naphthalene as supplied for a standard for calorimetry.

The reaction of sodium with naphthalene has also been studied to some extent using liquid ammonia as solvent. At ordinary temperatures, the reaction products are sodamide and tetralin. At low temperatures a red solution is obtained which has been shown by Wooster (J. A. C. S. 53 179–187 1931), to be in all probability a monosodium tetralin formed by addition of four atoms of sodium to one molecule of naphthalene, followed by immediate ammonolysis of three atoms of the sodium to sodamide as represented by the equations:

$$C_{10}H_8 + 4Na = C_{10}H_8Na_4$$

$$C_{10}H_8Na_4 + 3NH_3 = 3NaNH_2 + C_{10}H_{11}Na$$

Because of the large consumption of sodium and reactivity of the ammonia used as solvent, this method is practically useless as a means of preparing acids or other derivatives from naphthalene.

An object of this invention is to provide a method for causing alkali metals and specifically sodium, to be added to naphthalene; further object is to cause this reaction to be carried out at temperatures and under conditions favorable to the stability of the products; a further object is to provide a rapid reaction; my invention also includes the product or products formed by the addition of sodium and potassium to naphthalene. Other objects will appear from the description of the invention.

I have found that certain solvents and classes of solvents have a very specific action in promoting the reaction of alkali metals with naphthalene to form addition products. As stated, the action of these solvents is specific, but I do not know whether their action is catalytic, whether the solvent itself takes part in the reaction in some manner, or whether there are some solubility or other physical factors involved.

The solvents which I have found of such remarkable activity and usefulness for these reactions are broadly in the class of aliphatic ethers although all of these ethers are not effective, and of the effective ones, some are better than others. Thus I have used satisfactorily aliphatic mono ethers such as dimethyl ether, methyl ethyl ether, methyl normal propyl ether, methyl isopropyl and mixtures of these with other solvents. I have also tried other aliphatic mono ethers which would not permit this reaction to proceed, or in which the reactions are exceedingly slow, and which did not have the specific effective action of these above mentioned, for example, diethyl ether, methyl normal butyl ether, di isopropyl ether, methyl phenyl ether, methyl benzyl ether. These last mentioned ethers are without detectable effect in the addition of sodium to naphthalene, and as noted, there has been found an exceedingly slight action with lithium on naphthalene in diethyl ether. These ethers, however, are outside of the scope of my invention since they do not have the specific accelerating action of my "effective" or "active" aliphatic mono ethers first above given.

In general the mono ethers which are effective in promoting the reaction of alkali metals with napthalene or its homologues may be characterized as aliphatic ethers containing a $CH_3$—O group and in which the number of oxygen atoms and the number of carbon atoms are in a ratio of not less than 1:4. In the phrase "oxygen-carbon ratio of not less than 1:4" as used in the specification and claims, the ratio of 1:4 refers to the ratio of the number of oxygen atoms to the number of carbon atoms present in the ether.

Within the restrictions above given as to the limitations of the mono ethers applicable to effect these reactions these ethers must furthermore not be split by the alkali metal or the alkali metal addition compounds under the conditions used. I do not mean by this that the ethers may not react in some way in some reversible reaction with the alkali metal and/or naphthalene since indications are that the ethers in effecting the reactions may to some extent take part in the reaction, but the ether must not be broken up or form irreversible reaction products. Thus, for example, ethylene oxide may be considered a cyclic ether falling within the limitations given for oxygen-carbon ratio; however, it reacts with sodium naphthalene and hence cannot satisfactorily perform the function required. There may be very slow ether cleavage with some good solvents, but at a rate much slower than that of the desired reaction. In order to simplify the wording later I further specify such ethers as are "effective" within my invention as being "stable" although as noted they may play some reactive role in causing the reactions to proceed.

I have found that inert non-ether types of solvents such as hydrocarbons or alkyl sulfides which do not react with the alkali metals and which in themselves are non-effective for the reactions may be used as diluting agents for the effective mono ethers. There is, however, a minimum concentration of the effective ether in the non-effective solvents beyond which the reaction will not proceed. Thus, in general the effective dimethyl ether can be diluted with a non-reactive, non-effective hydrocarbon up to four or five times its volume. If the dilution be as high as six times the volume of the dimethyl ether the reaction will not proceed. With the higher mono ethers, which are non-effective in themselves, the dilution may be greater. Thus diethyl ether, which is not effective for the reactions, can be used in amounts up to ten times the volume of the effective dimethyl ether and the reaction of sodium and naphthalene will still proceed.

I have discovered that alkali metals can be added not only to naphthalene but to various homologues of naphthalene by the method of my invention. For further description, the invention will be illustrated particularly with respect to the reaction of napthalene with sodium, but it is to be understood that what is said thereon will apply equally well to the reaction of the other alkali metals and to any of the naphthalene homologues capable of forming addition compounds with alkali metal.

I have found that sodium reacts very readily with naphthalene in dimethyl ether solution even at $-70°$ C. Naphthalene also reacts readily with sodium using methyl-ethyl-ether as solvent. Other mixed mono ethers with one methyl and one higher primary alkyl group can also be used. The ease with which the reaction starts and the solubility of the addition compounds decreases, however, with increasing weight of the alkyl group. With mixed methyl ethers of butyl or higher alkyls it is necessary to add a small amount of an effective methyl ether to start the reaction, as the reaction appears to be very definitely autocatalytic when once started.

It is to be understood also that this invention includes the use as solvent, not only of the "effective" solvents as defined and illustrated, but also of mixtures of these solvents with other solvents which may include the less active ethers, and also hydrocarbons. The amount of such dilution permissible will vary within the particular substances employed as will appear in the examples given below. Considerably greater dilution with inert solvents is permissible after the reaction is definitely started.

I have further discovered that a solution of naphthalene in an "effective" ether will readily dissolve sodium in an amount equivalent to one gram atom of sodium for each gram molecule of naphthalene; thereafter the solution of further amounts of sodium becomes so slow as to be negligible. This is somewhat unexpected since the reaction products obtained by further treatment of the sodium-naphthalene compound, for example, with water or $CO_2$ indicate that it is in large part the 1,4 disodium naphthalene:

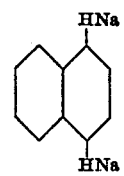

It is probable that this is an equilibrium reaction. It is also found that other isomeric disodium addition compounds are formed as evidenced by the formation of isomeric acids.

In view of the fact that the solution which is thus prepared, and contains one gram atom of sodium for each gram molecule of naphthalene, is a highly colored green solution and readily conducts an electric current, it is possible that the compound may exist in solution as a free radical which may be represented by the formula:

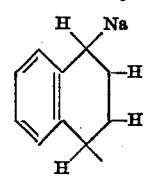

The soluble addition compound may involve the combination of disodium naphthalene with an extra molecule of naphthalene in some other manner. Thus its formula could be written:

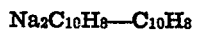

without specifying the exact method of combination. Moreover this soluble addition product may conceivably also include some combination with the ether solvent to account for the specific action of the effective aliphatic mono ethers. The reactions of this material, however, are clearly evident and I do not desire to be limited by any hypothesis as to the probable structure in solution.

If such a solution which contains sodium equivalent to one gram atom of sodium for each gram molecule of naphthalene be treated with water or alcohol, it will yield equivalent amounts of naphthalene and dihydronaphthalene; with $CO_2$ it will yield the sodium salts of dihydronaphthalene-dicarboxy acids, along with an equivalent amount of naphthalene. If, however, either the hydrolysis or the carboxylation is carried out gradually while further amounts of sodium are present in the liquid, further amounts of this sodium will dissolve as that in the solution is used by the hydrolysis or carboxylation. In this manner I have been able to react essentially all of the naphthalene and recover the major amount as the dihydronaphthalene or dihydronaphthalene-dicarboxy acid.

As indicated above, I have made this addition of sodium to naphthalene itself and to its homologues such as alpha and beta methyl naphthalene. I have found that in the case of naphthalene itself, the product formed is in large part the 1,4 disodium compound. Formation of this compound is probably permitted by the splitting of the double bonds between the 1:2 and 3:4 positions and the formation of a double bond between the 2:3 positions with the sodium occupying the free linkages thus created. Such a mechanism would permit addition in a similar manner in the case of substituted naphthalene where the 1:4 positions may be occupied by constituent groups since the reaction is not dependent on replacement of hydrogen or substituents by the sodium; there is no hydrogen evolved in the reaction of my invention as far as I have been able to discover.

I have discovered that this sodium naphthalene addition product is a very reactive material. Thus, as indicated above, hydrolysis can be made to take place to form dihydronaphthalene, or the addition product still in the ether solution can be treated with $CO_2$ and converted into sodium salts of dihydronaphthalene-dicarboxylic acids, which can be isolated. The further reactions of this sodium naphthalene addition product are not, however, claimed in this application, but are the subject matter of co-pending applications and applications to be filed at a later date.

In carrying out these reactions, I have found it to be of importance to have the surfaces of the sodium clean. Thus the solvent must be purified of such materials as will react with sodium and tend to form insoluble coatings thereon, under the conditions to be used, and the sodium should be protected from contact with such reactive materials from the time it is mechanically subdivided. Extreme fineness of sodium is not required although the rate will be dependent, among other things, on the extent of sodium surface, and this affords one means of controlling the rate. The naphthalene need not be of extreme purity. Technical flake naphthalene works quite satisfactorily. The complete absence of all sulfur compounds is not essential as shown by the fact that dimethyl sulfide can be used as an inert diluent solvent in the effective reaction medium for the reaction of sodium with naphthalene. The presence of free $CO_2$ dissolved in the solvent is likely to interfere with the reaction of sodium with naphthalene starting because of coating the sodium.

On the other hand, when the reaction is well started, dry $CO_2$ can then be introduced and the carboxylation carried on simultaneously as long as care is taken that the rate is insufficient to destroy completely all the green color of the sodium naphthalene compound, which will continue to be formed by the reaction of additional sodium. In this way the preparation of the sodium salts of the dicarboxy acids can be carried out simultaneously in a single vessel. In order to insure complete freedom from metallic sodium in the product, however, it is better to filter the green solution of the sodium naphthalene away from unreacted sodium and treat it with $CO_2$ in a separate vessel. This precipitates the sodium salts which can be filtered out and the solvent, together with unreacted naphthalene and a small amount of the sodium naphthalene compound returned to the first vessel. Such a process can be operated either as a batch process or continuously.

The concentration of naphthalene or its derivatives that can be used is limited only by its solubility. The reaction temperature can vary from at least $-80°$ C. to above the melting point of sodium, limited only by the stability of the combination of materials used and that of the product. The reactions in general are fast up to the solution of one gram atom of sodium per gram molecule of naphthalene in solution. In these reactions, both in the prior reaction with sodium and in the carboxylation, obviously pressures above atmospheric may be used if desired or necessary to confine the solvents at the temperatures found most optimum for the reaction. The following examples are given by way of further illustration:

Example I 400 c. c. of liquid dimethyl ether were placed in a flask and maintained at or just below its boiling point at atmospheric pressure. To this was added 30.5 gms. of flake naphthalene and then 11.3 gms. of clean, finely divided sodium. The reaction commenced immediately on adding the sodium, as was evidenced by the solution turning an intensely green color. This solution was agitated continuously for about fifteen minutes and then a slow stream of $CO_2$ was introduced; this stream of $CO_2$ was maintained at such rate that the green color of the solution was not completely discharged until the sodium had essentially all dissolved or reacted. Toward the end of two hours the carboxylation was allowed to go to completion, giving a white slurry of sodium salts of dihydronaphthalene dicarboxylic acids. By treating the salts with aqueous HCl and repeated extraction with ether, a total yield of 87% of theory of a mixture of the isomeric dibasic acids was isolated. The reactions are presumed to be essentially quantitative, although a portion of the acid is difficult to extract from water. It is found that a considerable portion of the isomeric acids was the 1:4 acid. If carboxylation is carried out at low temperatures, $-60°$ C. to $-80°$ C.; higher yields of the 1:4 acid have been obtained. Other crystallizable acids are obtained in varying amounts, amongst which the 1:2 acid has been found in considerable amounts.

Example II

The reaction of 2 gms. potassium with 6 gms. naphthalene was carried out in 400 c. c. methyl ether at $-25°$ C. The reaction occurred at about the same rate as sodium, but there was evidence of a side reaction probably involving impurities in the methyl ether. This resulted in the formation of a white precipitate even before $CO_2$ was introduced, and a corresponding decrease in the yield of dicarboxylic acids obtained.

Example III

A small amount of finely divided sodium, and of naphthalene were placed in a test tube filled with nitrogen and a few cubic centimeters of purified methyl isopropyl ether distilled in. There was no immediate formation of colored compounds, but on standing overnight there was definite formation of a yellowish green material partly dissolved. The greenish color was intensified by warming to the boiling point.

Example IV 76 c. c. of methyl normal butyl ether containing 39 gms. naphthalene and 11.5 gms. sodium failed to show evidence of reaction at temperatures from −30° C. to the boiling point. By adding 23 c. c. of methyl ether, keeping the mixture cool enough to absorb this amount at atmospheric pressure, the reaction started readily, but the product appeared to be less soluble than in pure methyl ether.

Example V 11.5 gms. sodium and 39 gms. naphthalene were added to 100 c. c. of methyl ethyl ether. Reaction began at once. After treatment with $CO_2$, a gross yield of 63% of the theoretical amount of dihydronaphthalene dicarboxylic acids was isolated from the sodium salts. The remainder represented mainly unreacted napthalene and sodium.

Example VI 11.3 gms. sodium and 32 gms. of naphthalene were added to 250 c. c. anisole. Reaction would not start even when fresh sodium surfaces were formed in the reaction mixture, or the temperature varied from room temperature to −35° C. The addition of 100 c. c. of methyl ether failed to induce reaction; reaction did occur with a total of 150 c. c. methyl ether present.

Example VII 5.8 gms. of sodium and 19 gms. of naphthalene were added to 100 c. c. of xylene. No colored compounds formed at room temperature or down to −35° C. Methyl ether was added in small increments. No color formed after 18 c. c. has been added, but did form with a total of 23 c. c. of dimethyl ether. Treatment with $CO_2$ after 3½ hours gave sodium salts from which were isolated 1.7 gms. of organic acids. The colored sodium compound did not appear to be very soluble in this solvent.

I claim:

1. Method of effecting the addition of an alkali metal to an aromatic hydrocarbon of the group consisting of naphthalene and its alkyl derivatives which comprises bringing the alkali metal and the hydrocarbon together in a reaction medium comprising an amount sufficient to promote the reaction of a stable aliphatic mono ether having an oxygen to carbon ratio of not less than 1:4 and in which there is a $CH_3$—O—group.

2. Method of effecting the addition of an alkali metal to an aromatic hydrocarbon of the group consisting of naphthalene and methyl naphthalene which comprises bringing the alkali metal and the hydrocarbon together in a reaction medium comprising an amount sufficient to promote the reaction of a stable aliphatic mono ether having an oxygen to carbon ratio of not less than 1:4 and in which there is a $CH_3$—O—group.

3. Method of effecting the addition of sodium to an aromatic hydrocarbon of the group consisting of naphthalene and its alkyl derivatives which comprises bringing sodium and the hydrocarbon together in a reaction medium comprising an amount sufficient to promote the reaction of a stable aliphatic mono ether having an oxygen to carbon ratio of not less than 1:4 and in which there is a $CH_3$—O—group.

4. Method of effecting the addition of sodium to naphthalene which comprises bringing the sodium and naphthalene together in a reaction medium comprising an amount sufficient to promote the reaction of a stable aliphatic mono ether having an oxygen to carbon ratio of not less than 1:4 and in which there is a $CH_3$—O—group.

5. Method of effecting the addition of sodium to methyl naphthalene which comprises bringing the sodium and naphthalene together in a reaction medium comprising an amount sufficient to promote the reaction of a mono ether having an oxygen to carbon ratio of not less than 1:4 and in which there is a $CH_3$—O—group.

6. A sodium addition product of naphthalene.

7. As a new composition of matter, disodium naphthalene.

8. As a new composition of matter 1,2-disodium naphthalene.

9. As a new composition of matter 1,4 disodium naphthalene.

10. A reactive ether solution of an organometallic compound comprising a solution of an alkali metal addition to a compound of the group consisting of naphthalene and its alkyl derivatives in a solvent comprising an amount sufficient to promote the reaction of a stable aliphatic mono ether having an oxygen to carbon ratio of not less than 1:4 and in which there is a $CH_3$—O—group.

11. A reactive ether solution of an organometallic compound comprising a solution of a 1,4 di-alkali metal addition to a compound of the group consisting of naphthalene and its alkyl derivatives in a solvent comprising an amount sufficient to promote the reaction of a stable aliphatic mono ether having an oxygen to carbon ratio of not less than 1:4 and in which there is a $CH_3$—O—group.

12. A solution of a sodium-naphthalene addition product in a stable aliphatic mono ether having an oxygen to carbon ratio of not less than 1:4 and having a $CH_3$—O—group.

13. A solution of 1,4 disodium naphthalene in dimethyl ether.

14. A solution of 1,2 disodium naphthalene in dimethyl ether.

NORMAN D. SCOTT.